(12) United States Patent
Hayes

(10) Patent No.: US 6,725,485 B2
(45) Date of Patent: Apr. 27, 2004

(54) MATTRESS AND BEDPAN CUSHION SYSTEM

(76) Inventor: John H. Hayes, 22 Trail Rd., Bristol, VA (US) 24210

( * ) Notice: Subject to any disclaimer, the term of this patent is extended or adjusted under 35 U.S.C. 154(b) by 0 days.

(21) Appl. No.: 10/231,188

(22) Filed: Aug. 30, 2002

(65) Prior Publication Data

US 2002/0194677 A1 Dec. 26, 2002

Related U.S. Application Data

(63) Continuation-in-part of application No. 10/152,794, filed on May 23, 2002, now abandoned, which is a continuation-in-part of application No. 10/032,739, filed on Jan. 2, 2002.
(60) Provisional application No. 60/260,373, filed on Jan. 8, 2001.

(51) Int. Cl.[7] .................................................. A61G 7/02
(52) U.S. Cl. .................................................. 5/695; 5/604
(58) Field of Search ........................ 5/695, 604, 605, 5/606

(56) References Cited

U.S. PATENT DOCUMENTS

| | | | |
|---|---|---|---|
| 1,054,452 A | 2/1913 | Sayen | |
| 2,318,240 A | * 5/1943 | Mas | .............................. 5/604 |
| 2,615,175 A | 10/1952 | Corakas | |
| 3,146,469 A | 9/1964 | Slade | |
| 3,833,945 A | 9/1974 | Moody | |
| 4,011,610 A | * 3/1977 | Parker, III | ...................... 5/604 |
| 4,122,565 A | 10/1978 | Hoben | |
| 4,244,066 A | 1/1981 | Rukawina | |
| 4,737,999 A | 4/1988 | Halverson | |
| 4,819,287 A | 4/1989 | Halverson | |
| 4,847,932 A | 7/1989 | Baribault | |
| 4,998,301 A | 3/1991 | Markus | |
| 5,077,845 A | * 1/1992 | Tokunaga et al. | .............. 5/605 |
| 5,081,721 A | 1/1992 | Stefano | |
| 5,142,717 A | * 9/1992 | Everard et al. | ................. 5/709 |
| 5,185,897 A | 2/1993 | Van Laanen | |
| 5,193,232 A | 3/1993 | Flood et al. | |
| D335,999 S | 6/1993 | Van Driessche | |
| 5,327,599 A | 7/1994 | Bradley | |
| 5,350,369 A | 9/1994 | Workman et al. | |
| 5,839,130 A | 11/1998 | Markus | |
| 5,890,246 A | 4/1999 | Davis | |
| 6,000,078 A | 12/1999 | Stefano | |
| 6,223,368 B1 | 5/2001 | Anslin | |
| 6,243,898 B1 | 6/2001 | Ruff | |

FOREIGN PATENT DOCUMENTS

WO    WO 87/02235    4/1987

* cited by examiner

*Primary Examiner*—Teri Pham Luu
*Assistant Examiner*—Fredrick Conley
(74) *Attorney, Agent, or Firm*—Crowell & Moring LLP

(57) ABSTRACT

A support structure, such as a mattress, is provided for the placement and removal of a human waste container, such as a bedpan, with minimal exertion by the attendant and minimal movement of the person. The mattress is provided with a cavity equipped with a controllable expandable cushion. Prior to use, the bedpan is placed in the cavity on top of the contracted cushion and the cushion is expanded to raise the bedpan directly under the person. A mattress protector extends into the cavity to protect the cavity from leaks or spills which may result during the person's use of the bedpan. When fully expanded, the cushion completely fills the cavity so that it is substantially flush with the rest of the mattress. A bedsheet covers the mattress and is provided with a fly or flap for access to the cavity. A disposable wastebag system can be arranged onto the cavity for use in place of a bedpan. For added hygiene of the person using the bedpan or wastebag, the mattress can be arranged with a bidet system that releases a fluidic cleaning agent from a storage container into tubing embedded in the mattress, the fluid being finally expelled onto the part of the person's lower body exposed within the cavity.

45 Claims, 11 Drawing Sheets

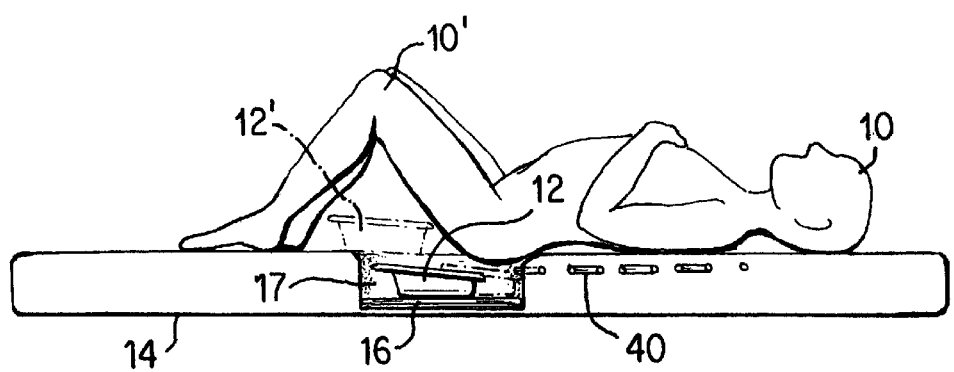
FIG. 1
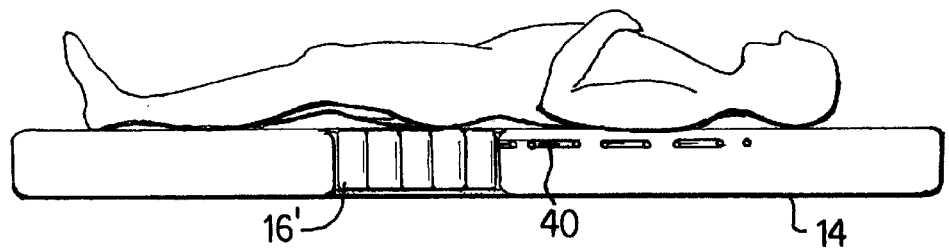
FIG. 2
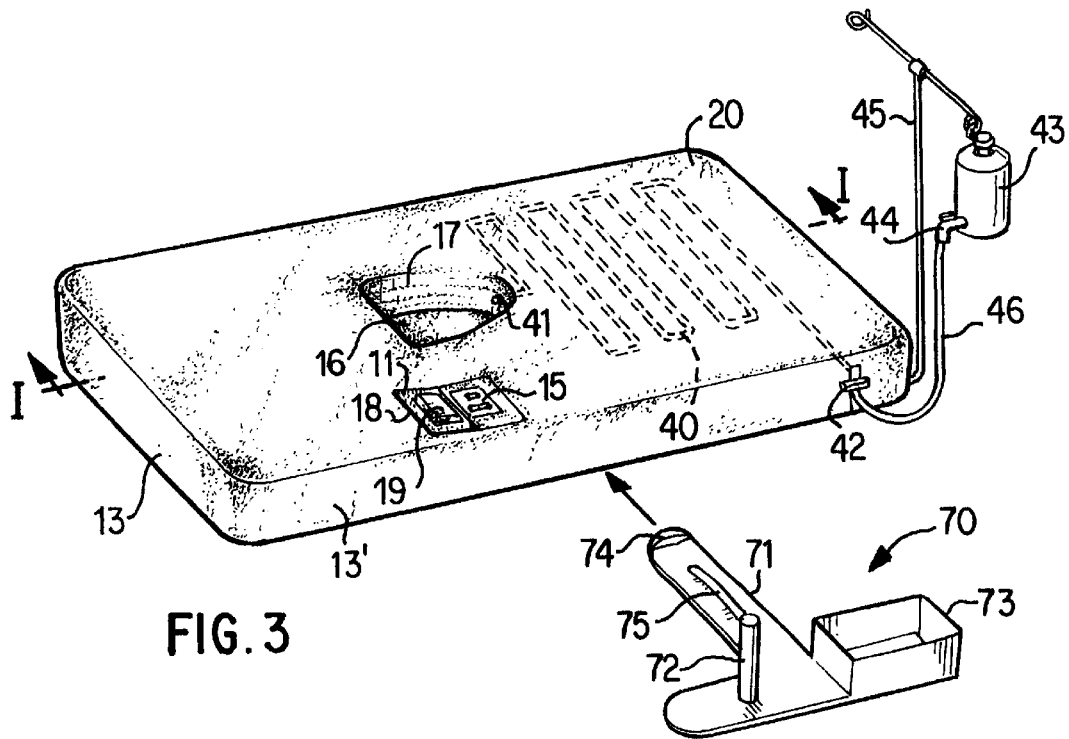
FIG. 3
FIG. 3A

MATTRESS AND BEDPAN CUSHION SYSTEM

CROSS REFERENCE TO RELATED APPLICATIONS

This application is a continuation-in-part of U.S. patent application Ser. No. 10/152,794, filed May 23, 2002 now abandoned, which is a continuation-in-part of U.S. patent application Ser. No. 10/032,739, filed Jan. 2, 2002, as a continuation of provisional Application No. 60/260,373, filed Jan. 8, 2001.

FIELD OF THE INVENTION

This invention relates to the field of mattresses equipped to accommodate a bedpan system.

BACKGROUND OF THE INVENTION

Conventional bedpan systems pose many problems for the person using the bedpan as well as the attendant helping the person. Such difficulties include rolling the person over on his or her side, placing the bedpan on the bed, rolling the person onto the bedpan for use and off of the bedpan after use. The difficulties associated with rolling the person often lead to the person slipping off the bedpan and onto the mattress, thus soiling the bed linens and the person's garments. Further, if the person is very large or completely immobile, there is a high probability that the attendant may become injured by the physical exertion associated with moving the large or immobile person onto and off of the bedpan. Such problems can cause embarrassing, uncomfortable, and potentially dangerous circumstances for both the person and the attendant.

Various attempts have been made to overcome the problems associated with the use of conventional bedpan systems. Some attempts have included mattresses with cavities for accepting a bedpan. For example, U.S. Pat. Nos. 4,011,610 and 6,243,898 B1 disclose mattresses with plugs which must be manually removed and inserted in order to expose a cavity equipped to accept a bedpan assembly. U.S. Pat. No. 4,122,565 also discloses a mattress with a cavity, the cavity being closed by way of a slidable plug. These attempts do not provide for the careful positioning of the bedpan directly under the person such that the risks of leaks or spills in the cavity or on the person are avoided. Moreover, use of the removable plugs generally disadvantageously requires some movement of the person.

Other attempts have included placing inflatable mattresses or devices equipped to accept a bedpan assembly on top of a conventional mattress. For example, U.S. Pat. No. 5,081,721 discloses an inflatable mattress with an access area to accommodate a bedpan in its middle section. The inflatable mattress is laid upon a standard mattress and, when inflated, lifts the person so that the bedpan can be inserted under him or her. U.S. Pat. No. 6,223,368B1 discloses an inflatable support device which is affixed to a conventional mattress and which can accommodate a bedpan once inflated. With these types of arrangements, the person is deprived of the comforts of a conventional mattress and may be left in an awkward position when on the inflated mattress or device.

To overcome the problems associated with the use of conventional bedpan systems, there is needed a mattress and bedpan system which provides for the careful placement of a bedpan directly under a person with minimal movement of the person, minimal physical exertion of the attendant, and minimal risk of leaks or spills on the mattress or person when the bedpan is being used or removed.

SUMMARY OF THE INVENTION

These needs are met in accordance with the present invention which provides a mattress system having a mattress with a top surface and a bottom surface. A cavity is arranged in the mattress. The cavity is open at least toward the top surface (and optionally a lateral side area of the mattress as well) and has a defined size. An expandable cushion is arranged in the cavity. The expandable cushion can advantageously fill the cavity in an expanded state so as to provide a comfortable mattress, and, in a contracted state, allow for a human waster container, such as a bedpan or wastebag, to be inserted (from either the top or the side) into the cavity for use by a person lying on the mattress. This advantageously minimizes, or eliminates, movement of the person in order to facilitate use of the bedpan or wastebag.

In another embodiment of the invention, in order to facilitate the person's personal and private hygiene, the mattress may also be equipped with a bidet system capable of being operable by the person using the bedpan or wastebag. The bidet system permits the release of a fluidic cleaning agent to the part of the person's lower body exposed within the cavity thus permitting the person to clean him or herself immediately after use of the bedpan or wastebag.

In accordance with the present invention, a control system is operatively coupled with the expandable cushion to control the expansion and contraction thereof. In one embodiment, the cushion is an inflatable and deflatable cushion. Of course, other means for expanding the cushion can be used, such as liquid fluids, mechanical measures, or the like.

While the present invention is drawn to a mattress, it is applicable to any support structure with a top surface and a bottom surface on which a person may rest or recline. For example, a reclining chair, sofa, seat cushion, or the like may be provided with the cavity cushion system of the present invention. In that regard, it is intended the term mattress is to include any such support structure.

Other objects, advantages and novel features of the present invention will become apparent from the following detailed description of the invention when considered in conjunction with the accompanying drawings.

BRIEF DESCRIPTION OF THE DRAWINGS

FIG. 1 is a longitudinal cross-section view, taken along line I—I of FIG. 3, of the mattress system of the present invention depicted with the addition of a bedpan, a bidet system and a person lying on the mattress FIG. 2 is a longitudinal cross-section view of the mattress depicted in FIG. 1 with the bedpan removed and the cushion fully expanded according to the present invention.

FIG. 3 is a top perspective view of the mattress according to the present invention showing the cavity, and the control switch used for expanding and contracting the cushion within the cavity, and the bidet system which includes a serpentine-like coil extending from the fluidic cleaning agent container, shown at the head of the bed, to the mattress cavity.

FIG. 3A is a schematic view of an attachment to the mattress that includes a tissue holder and a container for handwipes.

DETAILED DESCRIPTION OF THE DRAWINGS

Figure 4A:
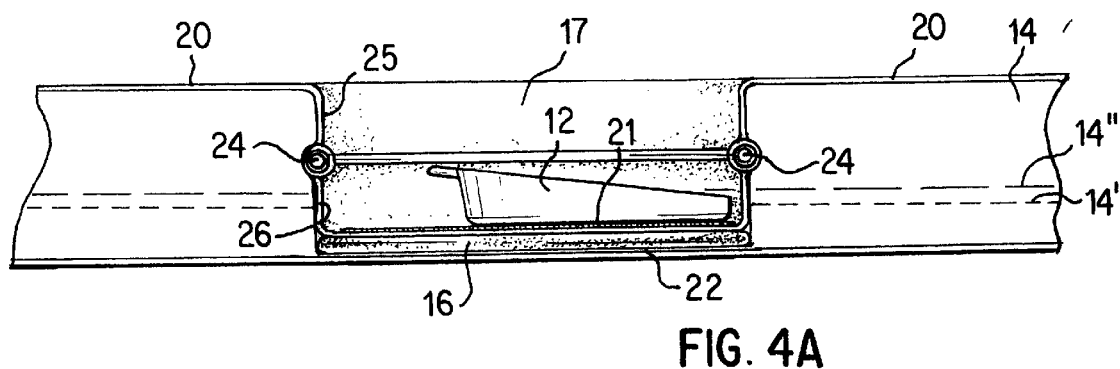
FIG. 4A is an enlarged detailed view of the mattress cavity with the bedpan positioned on top of the contracted cushion.
Figure 20:
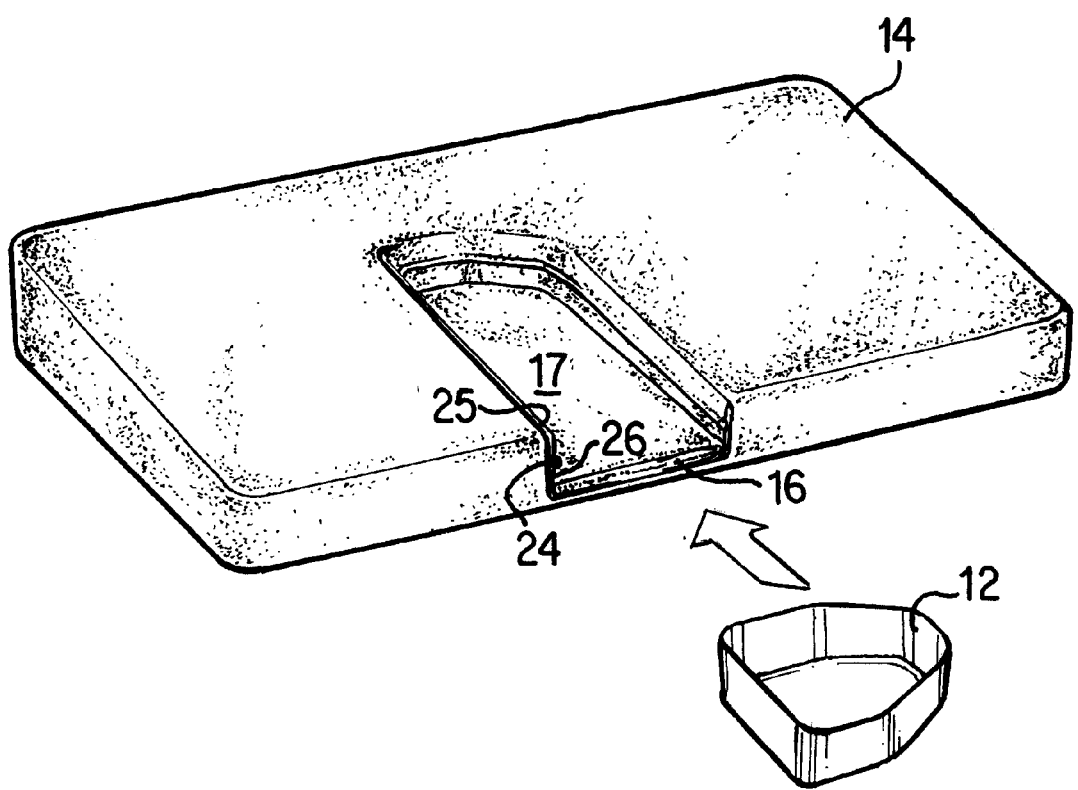
FIG. 20 is a top perspective view of the mattress according to another embodiment in which the cavity opening extends toward a lateral side surface of the mattress to allow for the lateral insertion of a bed pan.

In FIG. 1, a person 10 is shown lying on a mattress 14. The mattress 14 has a cavity 17 arranged in a central portion of the mattress 14 (FIG. 3) where a human waste container, such as a bedpan 12, would typically be arranged. Inside the cavity 17, an expandable cushion 16 (also known as a "bladder") is shown in its contracted state. The cushion 16 is attached to the bottom of the cavity 17 by an attachment 22. The cushion can be expanded, for example, by inflation with air, by filling with a liquid, or by mechanical measures such as with spring device. Arranged on the deflated cushion 16 is a bedpan 12, also shown in phantom 12', that fits in the cavity 17. The bedpan 12' can be inserted into the cavity 17 by an operator (user or attendant) who places the bedpan 12' into the cavity 17 between the person's legs 10', which may be bent if necessary to facilitate the process. FIG. 4A shows an enlarged detailed view of the bedpan 12 on the contracted cushion 16. Alternatively, as shown in FIG. 20, the cavity 17 can extend toward a lateral side surface of the mattress 14. In that manner, when the cushion 16 is in its deflated state, the bed pan 12 can be inserted from the side surface so as not to disturb the person on the mattress 14.

Referring to FIGS. 1, 2, and 3, the bidet system is depicted by pliable tubing 40 embedded below the surface of the mattress in a serpentine-like coil. The pliable tubing 40 is embedded in the mattress 14 in the area where a person s upper torso is located when lying down on the mattress 14. By placing the pliable tubing 40 in this part of the mattress 14, the fluidic cleaning agent (for example water), running through the pliable tubing 40 is heated by the warmth of the person's body. The pliable tubing 40 terminates close to the top of the cavity 16 with an outlet port 41 that may include a spray nozzle (not shown) for distributing the fluidic cleaning agent upon the part of the person's lower body exposed within the mattress cavity 16. The fluidic cleaning agent is stored in a container 43 that is connected to the bed frame 45. The container 43 has an operative mechanism 44 from which the fluidic cleaning agent is released into a feeder connector 46. An inlet port having a valve mechanism 42 regulates the flow of the fluidic cleaning agent from the feeder connector 46 to the pliable tubing 40. The valve mechanism can be arranged on the side of the mattress 14 such that it is operable by the person using the bedpan or wastebag system.

To facilitate the person's ability to clean himself or herself when using the bidet system of the present invention, a tissue holder 70 can be attached to the mattress 14 as depicted in FIG. 3A. The tissue holder 70 has an attachment 71 to provide support for a peg 72 to accommodate a roll of tissue and a container 73 to hold hand wipes. The attachment 71 is, for example, supported on the bottom part of the mattress 14 through sliding and locking retainer means, shown schematically as 74, 75, that anchor the attachment 71 to the underside of the mattress 14.

Figure 4B:
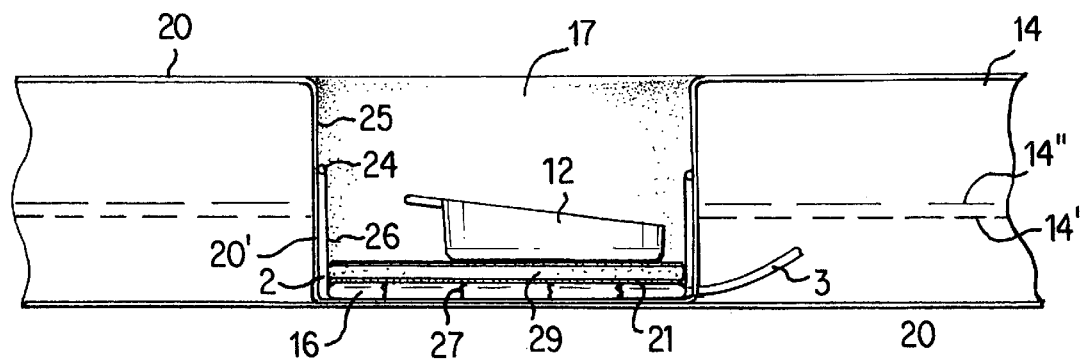
FIG. 4B is another embodiment of the invention as depicted in FIG. 4A showing the bedpan positioned on top of a mattress-like product.
Figure 5A:
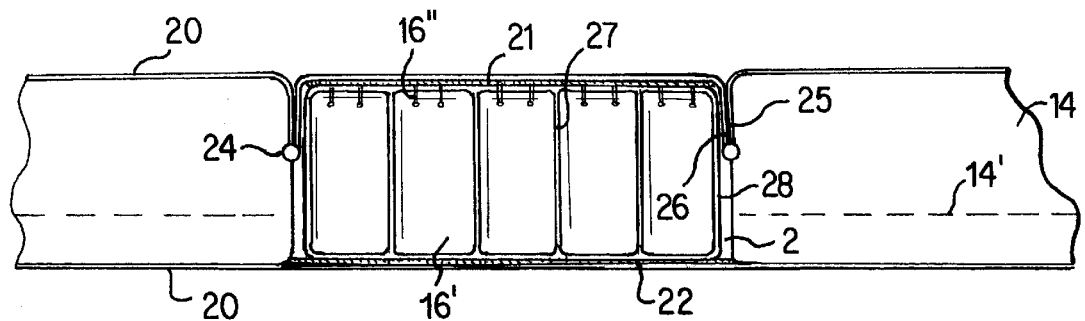
FIG. 5A is an enlarged detailed view of the mattress cavity with the cushion fully expanded within the cavity.

Referring to FIGS. 3, 4A and 4B, and 5A and 5B, the mattress 14 is shown covered with a mattress protector 20. In the embodiment depicted in FIGS. 4A and 5A, that portion of the mattress protector 20 extending into the cavity 17 is made of a pliable material 25, 26. The pliable material 25, 26 is attached to a retainer 24, depicted as a hoop or a ring. The retainer 24, which may be made of a flexible material, is recessed in the cavity 17 between the top and bottom surfaces of the mattress 14 on the periphery of the cavity 17. The retainer 24 is shown in FIGS. 4A and 5A in a position half-way between the top of the mattress 14 and the top of the cushion 16 in its deflated state. The bottom half of the pliable material 26 is attached to the top of the cushion 16 by way of an attachment 21 (for example Velcro®) (FIG. 4A). As a result of the attachment of the pliable material 25, 26 to the retainer 24, when the cushion 16 is expanded, the part of the pliable material 26 below the retainer 24 raises with the top of the cushion 16 while the part of the pliable material 25 above the retainer 24 stays in place (FIG. 5A). With this configuration, any spills or leaks which occur, either when the cushion 16 is contracted or expanded, will be contained within the pliable material 25, 26 of the mattress protector 20.

Figure 5B:
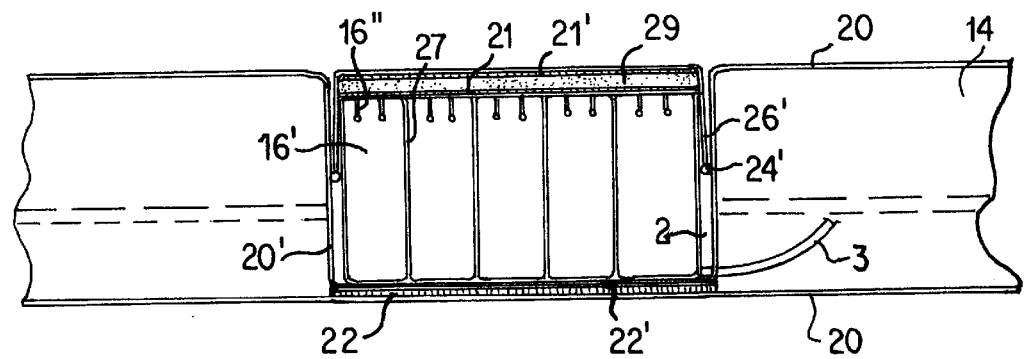
FIG. 5B is another embodiment of the invention as depicted in FIG. 5 showing a mattress-like product on top of the fully expanded cushion.

In the embodiment depicted in FIGS. 4B and 5B, the cushion is raised and lowered within an enclosure 2 in the cavity 17 of that part of the mattress 14. The enclosure 2 is the result of a two-layer configuration of the mattress protector 20 that extends into the cavity 17. The first layer is the mattress protector itself, which is provided with a retainer 24' and has a portion 20 above the retainer 24' and a portion 20' below the retainer 24'. The retainer 24' is shown in FIGS. 4B and 5B in a position half-way between the top of the mattress 14 and the top part of the cushion 16 in its deflated state. The part of the mattress protector 20' below the retainer 24' is secured to the bottom of the cavity 17 by an attachment 22'. The second layer is a pliable material 26' that also extends into the cavity 17 and is, for example, sewn to the retainer 24' on the mattress protector 20'. As a result of the attachment of the pliable material 26' and the mattress protector 20' to the retainer 24', when the cushion 16 is expanded, the pliable material 26' below the retainer 24' raises with the top of the cushion 16 while the part of the mattress protector 20' below the retainer 24' stays in place thus forming the enclosure 2. With this configuration, any spills or leaks which occur, either when the cushion 16 is contracted or expanded, are contained within the pliable material 26' of the mattress protector 20.

Referring to FIGS. 4A, 4B, 5A and 5B, the mattress 14 is shown with a maximum compression point 14" above an indenture load deflection plane 14'. A traditional mattress material may be provided above the deflection plane 14' and a firmer material may be provided below the deflection plane 14'. With this configuration, when the mattress 14 is compressed to its maximum compression point 14", there remains sufficient clearance between the maximum compression point 14" and the inflection plane 14' to position the bedpan 12 in the cavity 17.

Referring to FIGS. 5A and 5B, the cushion 16 may be equipped with vertical I-beams 27. The vertical I-beams 27 add to the stability of the fully expanded cushion 16 by forming a series of expandable chambers 16' within the cushion 16. The cushion 16, which may be made of a pliable material, is configured to expand when the cushion 16 is inflated and to contract when the cushion 16 is deflated. The expansion and contraction of the cushion 16 may be controlled by, for example, a device 3 (FIGS. 4B and 5B). The cushion 16 may also be equipped with an elastic material 28 at least on the sides of the cushion 16 to prevent deformation of the cushion 16 during expansion and contraction. The elastic material 28 is configured to stretch when the cushion 16 is inflated and to contract when the cushion 16 is deflated. To ensure that the fully expanded cushion 16 is of the same tactile consistency as the rest of the mattress 14, the top of the cushion 16 may be provided with a mattress-like product 29 (FIG. 5B). The mattress-like product 29 is attached to the top of the cushion 16 and the bottom of the mattress protector 20 by attachments 21, 21'. If desired, the cushion 16 and/or expandable chambers 16' may be filled with a foam material (not shown).

Referring to FIGS. 5A and 5B, ventilation openings 16" can be provided in the mattress protector 20 (see FIG. 6 also) and in the expandable cushion 16 to help maintain a dry condition and provide stimulation to the area of the hips. In the embodiment shown in FIG. 5B, the ventilation openings 16" are arranged on lateral sides of the cushion 16 in view of the use of the mattress-like product 29. Use of the ventilation openings 16" in an inflatable cushion 16 requires constant or intermittent use of an inflation source, such as an air pump. By constantly or intermittently using an air pump, the need for an absolutely air-tight cushion 16 is eliminated.

Figure 18:
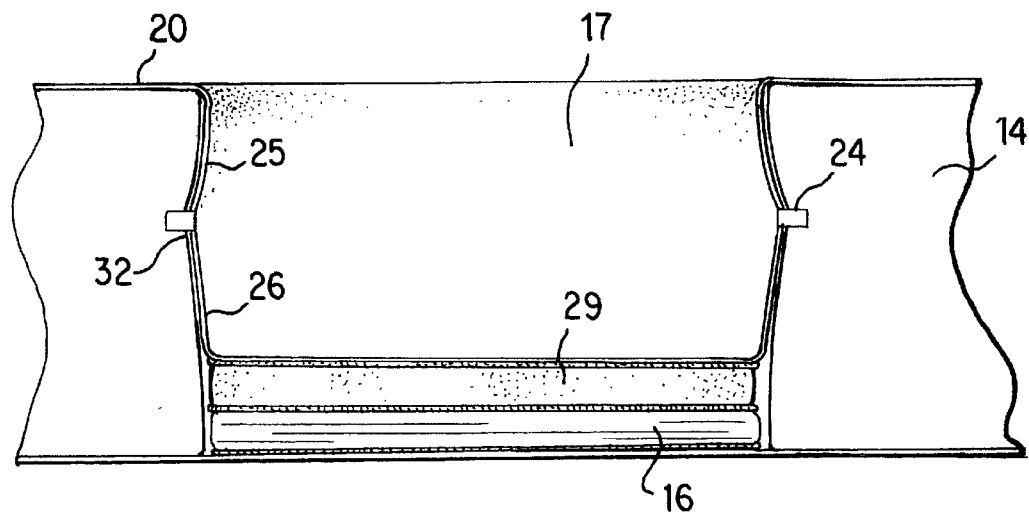
FIG. 18 is an enlarged detailed view of an alternative embodiment of the present invention showing the mattress cavity equipped with a retainer having a diameter larger than that of the cavity.
Figure 19:
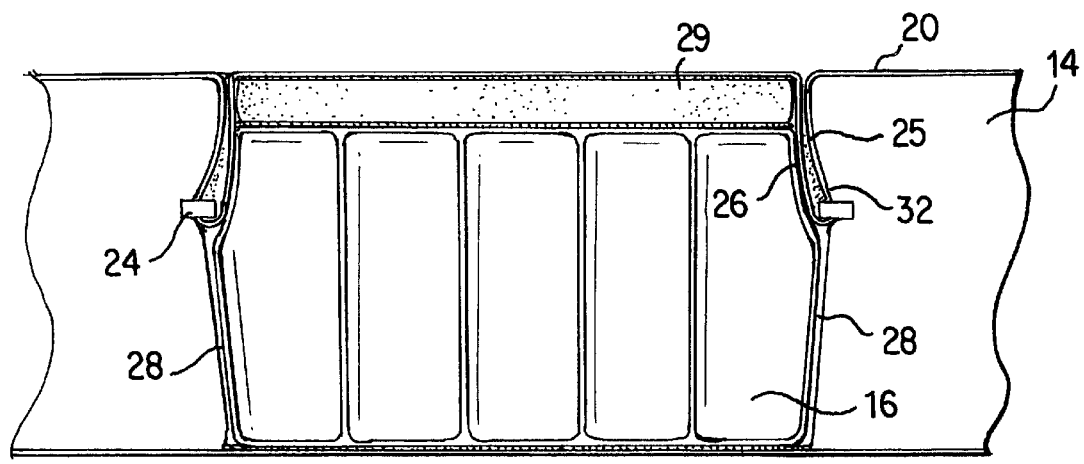
FIG. 19 is an enlarged detailed view of the mattress cavity as depicted in FIG. 18 with the cushion fully expanded within the cavity.

FIGS. 18 and 19 show an alternative embodiment of the mattress cavity 17 with the retainer 24 having a diameter or circumference greater than that of the cavity 17. The larger diameter of the retainer 24 causes an indenture 32 in the cavity 17 that serves to secure the retainer 24 within the cavity 17. The indenture 32 also provides extra room within the cavity 17 thus facilitating the expansion and contraction of the mattress-like product 29 on top of the cushion 16. When the cushion is fully expanded, the elastic material 28 contours against the indenture 32 (FIG. 19).

Figure 13:
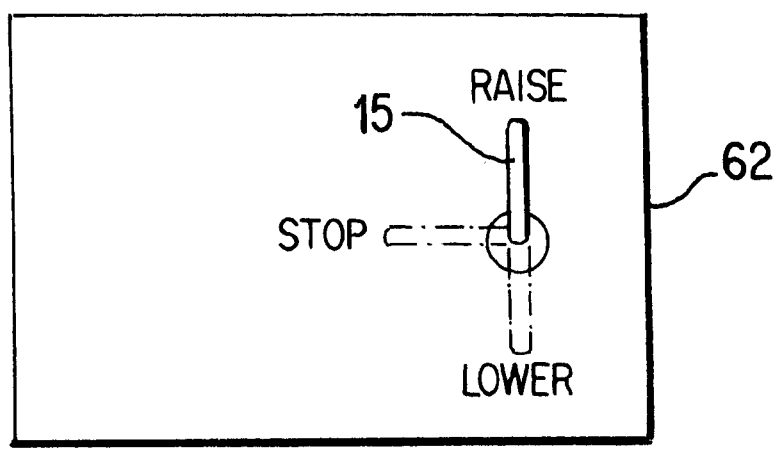
FIG. 13 is a detailed view of a control switch for use with the present invention.

The expansion and contraction of the cushion 16 is controlled by a control switch 15 which is depicted in FIG. 13. The control switch 15 can be located on the top of the mattress 14 (FIG. 3), on one of the sides 13, 13' of the mattress 14, or in any accessible location. Moreover, the switch can be a remote control device (not shown).

Figure 14:
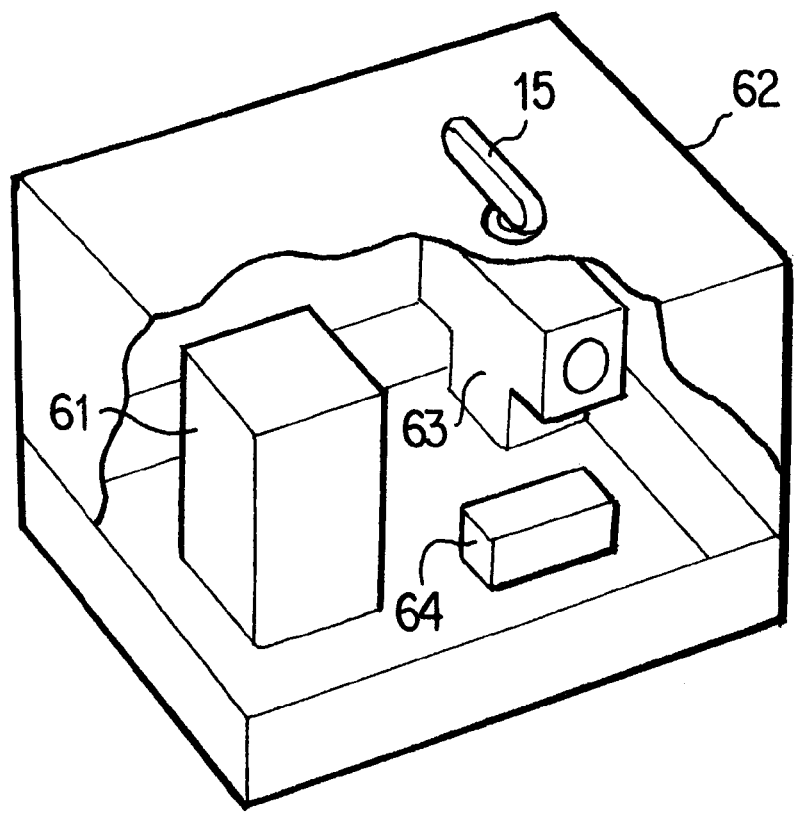
FIG. 14 is an cutaway perspective view illustrating the internal components of the control switch depicted in FIG. 13.

Referring to FIG. 14, the control switch 15 is shown as part of a control unit 62. The control unit 62 may be housed within the mattress 14 or its support structure. Alternatively, it may be attached to a side of the mattress 14, or the support structure thereof. The depicted control unit 62 is an inflation and deflation mechanism wherein the control switch 15 is attached to a three-way valve 63. The three way valve 63 controls the operation of an air pump 61 and an air release mechanism 64. The air pump 61 and air release mechanism 64 are used to inflate and deflate the cushion 16. A switchable vacuum pump may also be used to deflate the cushion 16 (not shown). If an air pump 61 or a vacuum pump is used, it may be desirable for the cushion 16 and/or the expandable chambers 16' to be filled with a foam material. As alternative embodiments, the control unit 62 may house a fluidic pump or the control switch 15 may be used to control a mechanical mechanism, such as a spring device, located within the cushion 16 (not shown). Of course, any known mechanisms that may operably expand the cushion can be used within the context of the present invention.

Figure 6:
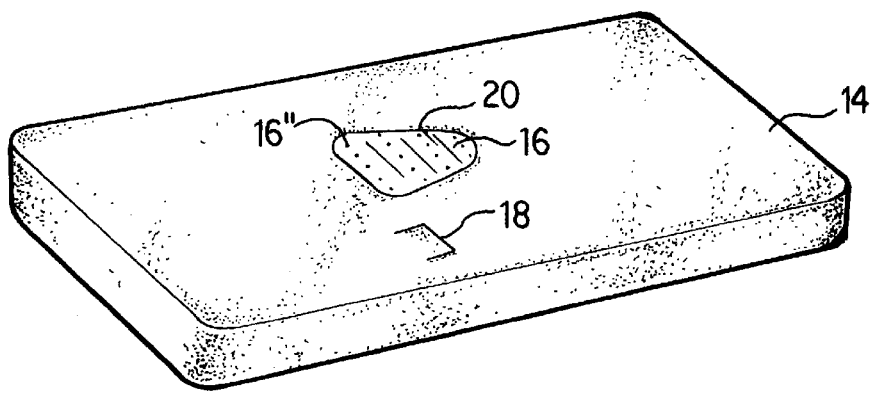
FIG. 6 is a top perspective view of the mattress, expanded cushion, and the control switch covered by a mattress protector.

FIGS. 3 and 6 depict the control switch 15 positioned on the top of the mattress 14. To provide access to the control switch 15 when it is in this position, the mattress protector 20 is provided with a flap 18. The flap 18 can be opened and closed to expose and conceal the control switch 15, respectively. The flap 18 is provided with a thick padding 19 and an attachment 11 (for example, Velcro®). When the flap 18 is closed, the attachment 11 secures the flap 18 to the mattress protector 20 and the thick padding 19 ensures that the control switch 15 cannot be felt through the top of the mattress 14.

Figure 7:
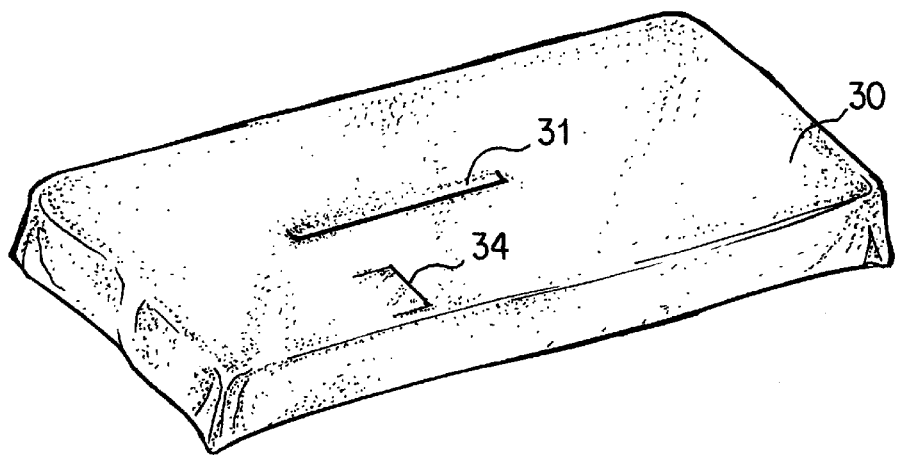
FIG. 7 is a top perspective view of the mattress with a bedsheet having openings providing access to the cavity and to the control switch.
Figure 8:
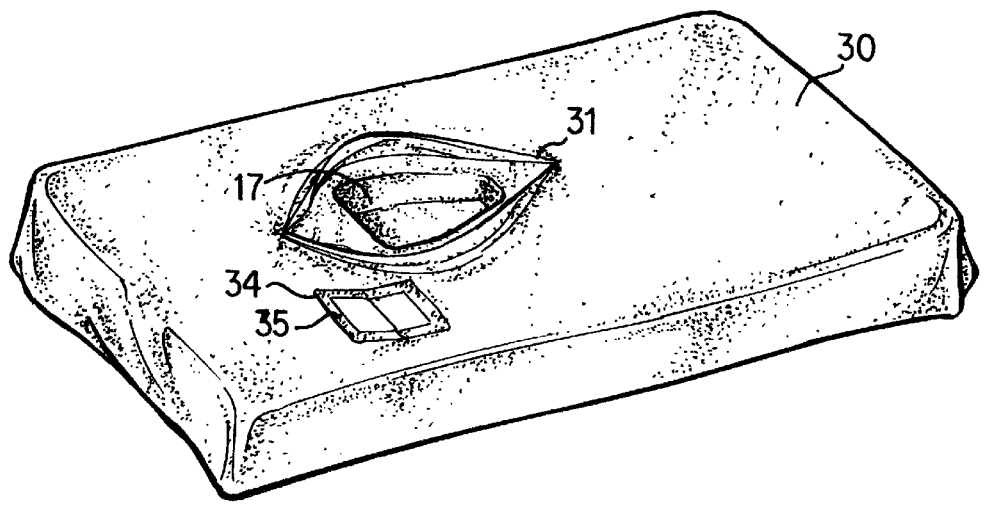
FIG. 8 is a top perspective view of the bedsheet depicted in FIG. 7 shown in its open state allowing access to the cavity and control switch.
Figure 15:
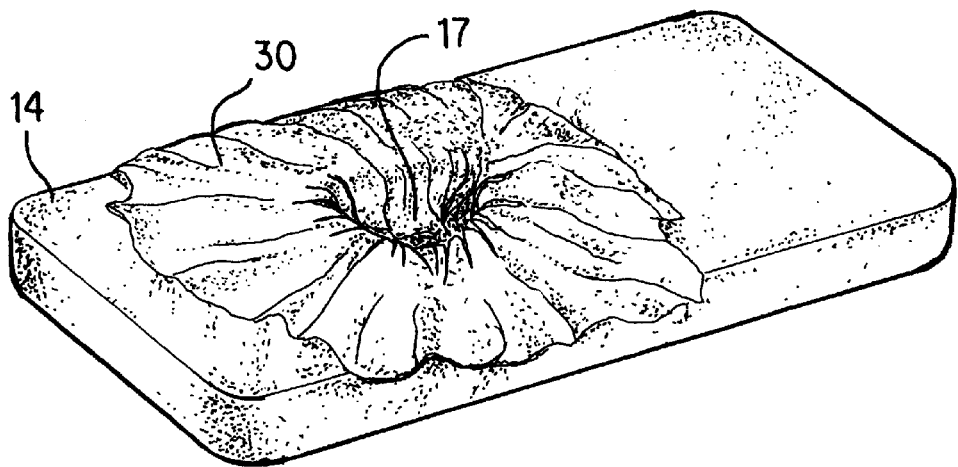
FIG. 15 is another embodiment of the invention depicted in FIGS. 7 and 8 showing a bedsheet gathered into the cavity prior to the placement of the bedpan or wastebag system.
Figure 16:
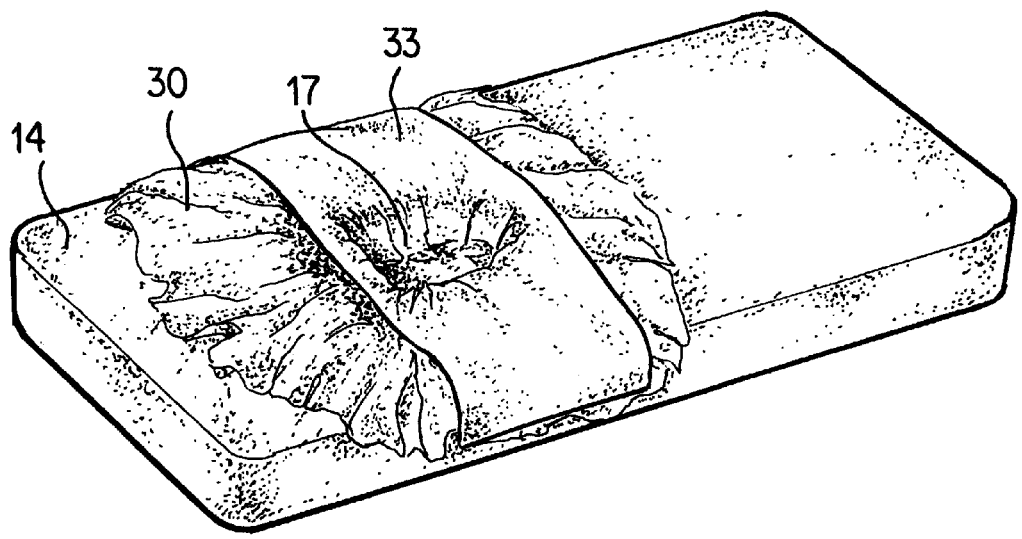
FIG. 16 is another embodiment of the invention depicted in FIG. 15 with an underpad positioned on top of the gathered bedsheet.

FIGS. 7 and 8 depict the bedsheet 30 for use with the mattress system of the present invention. The bedsheet 30 is provided with a slit which is closed by a fly or a flap 31. The fly or flap 31 may be secured to the bedsheet 30 with an attachment (not shown). When the sides of the fly or flap 31 are pulled apart, the cavity 17 is exposed. The bedsheet 30 may also be provided with a flap 34 to provide access to the control switch 15, the flap 34 being secured to the bedsheet 30 with an attachment 35 (for example, Velcro®) when closed. As an alternative to the bedsheet equipped with the fly 31, a traditional bedsheet 30 may be used (FIG. 15). In this embodiment, the bedsheet 30 is gathered into the cavity 17 of the mattress 14 prior to the placement of the human waste container into the cavity 17. For added protection of the bedsheet from accidental spills, an underpad 33 may be placed on top of the gathered bedsheet 30 (FIG. 16).

Figure 9:
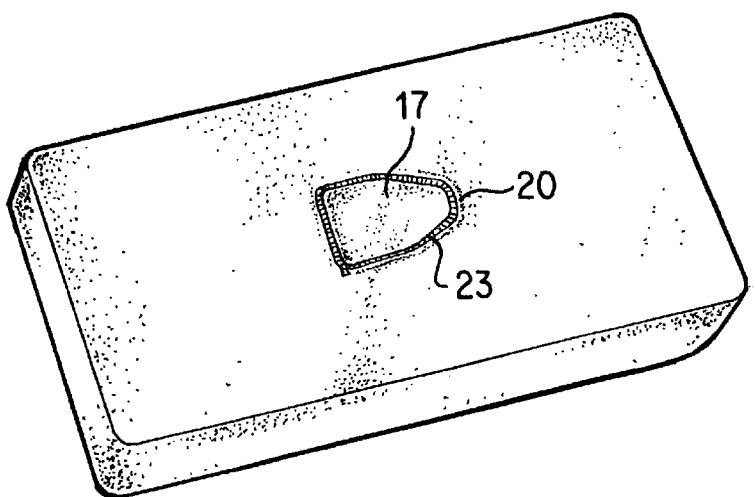
FIG. 9 is a perspective view of the bottom portion of the mattress according to the present invention having a zippered access to the cavity.

Referring to FIG. 9, the bottom of the mattress 14 may be provided with a zippered opening 23 to facilitate the removal of the cushion 16 for cleaning, replacement, or if it is no longer needed.

Figure 10:
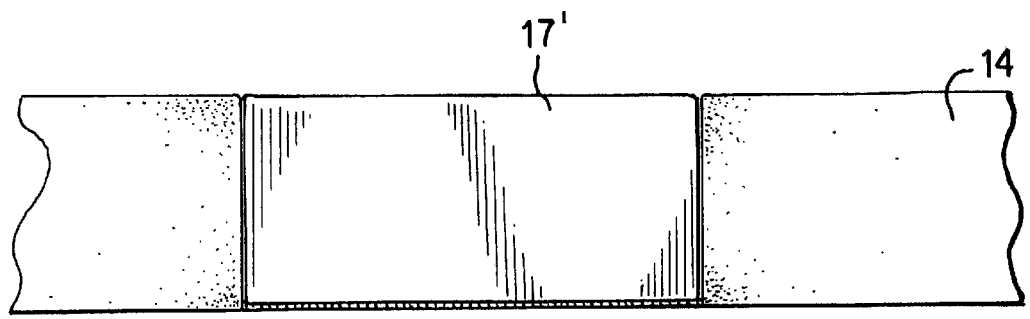
FIG. 10 is an enlarged detailed view illustrating a mattress-like product according to the invention, which fills the cavity when the mattress system of the present invention is not in use.

Referring to FIG. 10, a mattress cavity plug 17' can be inserted into the cavity 17 thereby turning the mattress 14 according to the present invention into a conventional mattress when the cavity cushion system of the present invention is not needed.

Figure 11:
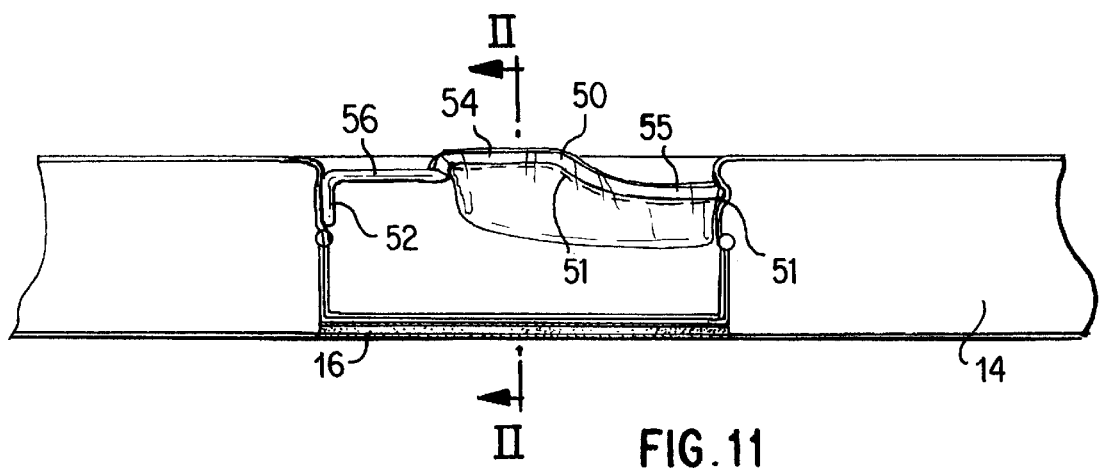
FIG. 11 is an enlarged detailed view of an alternate embodiment according to the invention in which a wastebag is used instead of a bedpan.
Figure 11A:
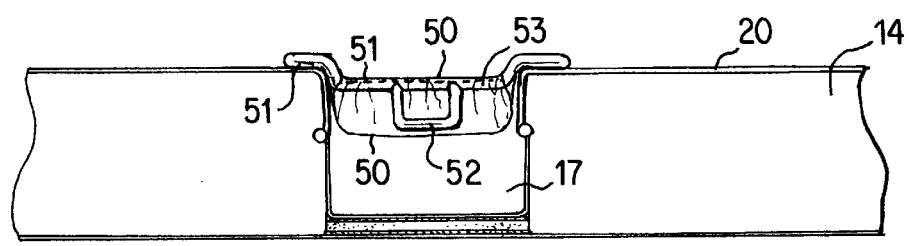
FIG. 11A is a cross sectional view taken along lines II—II of the mattress and wastebag system depicted in FIG. 11.
Figure 12:
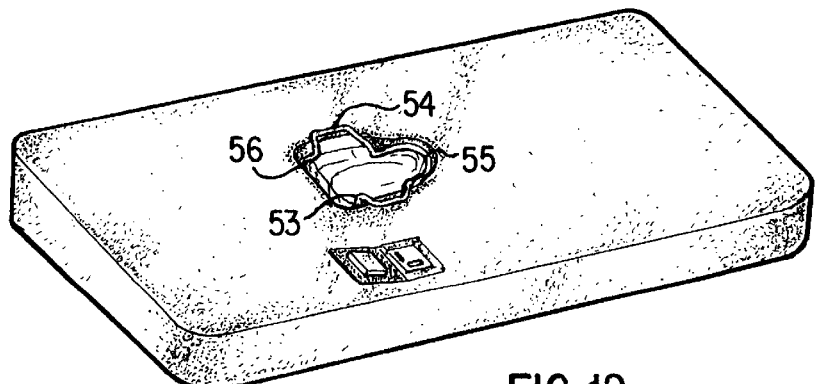
FIG. 12 is a top perspective view of a mattress having a cavity equipped with the wastebag system, and a control switch for expanding and contracting the cushion in the cavity according to the present invention.
Figure 17:
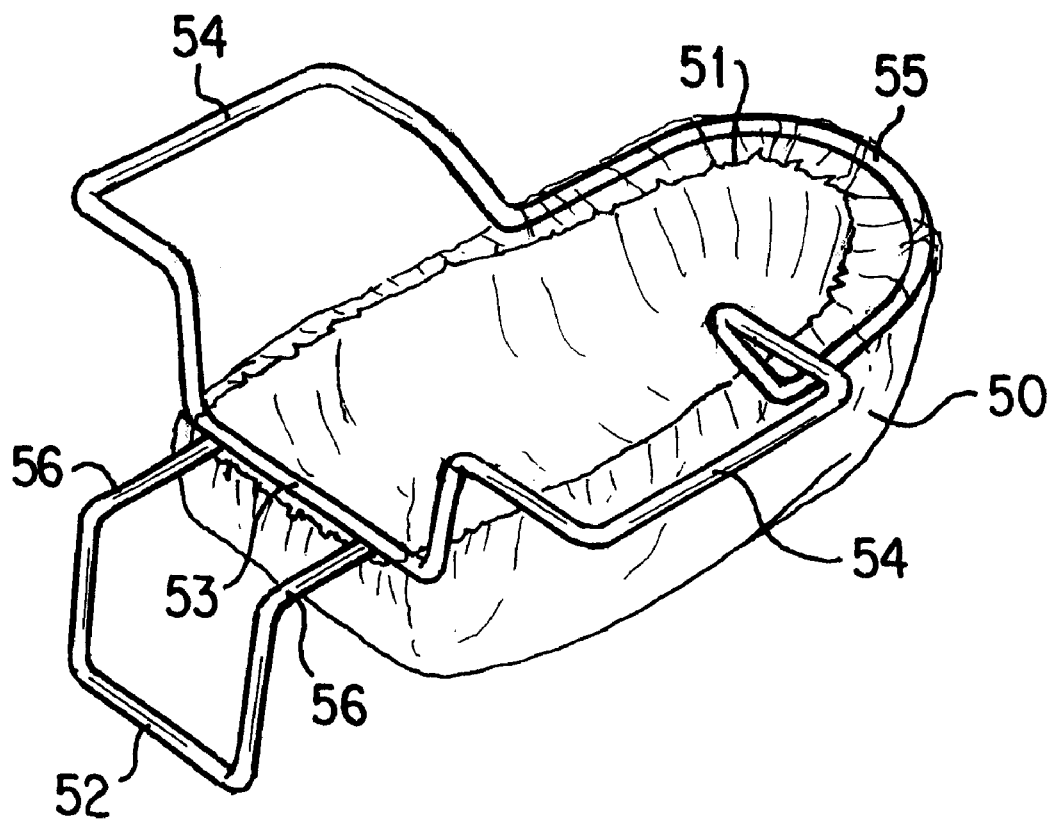
FIG. 17 is an enlarged perspective view of wastebag system according to the present invention.

FIGS. 11, 12, and 17 describe an alternative embodiment using a wastebag 50 as the human waste receptacle. In this embodiment, a support ring 53–55 mates with the cavity 17 under spring tension. One portion of the support ring 54 is supported on the top surface of the mattress, another portion 55 extends into the cavity 17, and a third portion 53 completes the ring 53–55. The wastebag 50 is secured to the ring 53–55 by means of an elastic material 51. To facilitate the placement and removal of the support ring 53–55 into the cavity 17, a handle 56 extends from the support ring 53–55. The handle 56 acts like a spring so as to be under tension when the end of the handle 52 engages the cavity 17.

The operation of the mattress and cavity cushion system will now be described in conjunction to the figures. When the person 10 needs to use a human waste container such as a bedpan 12 or a wastebag 50, the operator exposes the cavity 17 by pulling each side 32 of the fly or flap 31 on the bedsheet 30. This exposes the cavity 17 with the fully expanded cushion 16 (FIGS. 6–8). The operator then uses the remote control device or the control switch 15 to contract the cushion 16. If the control switch 15 is located on the mattress 14, the operator pulls back the flap 34 on the bedsheet 30 to expose the flap 18 on the mattress protector 30 which in kind is pulled back to expose the control switch 15.

Once the cushion 16 is deflated, the operator is ready to insert the bedpan 12 or wastebag system 52–56 into the cavity. If a bedpan 12 is being used, the operator positions the bedpan 12 on the deflated cushion 16 within the cavity 17 (FIG. 1). It may be necessary to bend the person's knees 10' in order to position the bedpan 12. The remote control device or the control switch 15 is then used to expand the cushion 16 until the bedpan 12 is directly under the person 10. If the wastebag system is being used, upon contraction of the cushion 16, the operator will secure the support ring 52–56 with the attached wastebag 50 to the cavity 17. During use of the wastebag system 52–56, the cushion 16 is left in its deflated state.

When the person has completed using the bedpan 12 or wastebag system 52–56, the bedpan 12 or wastebag system 52–56 is removed and a clean bedpan 12 or wastebag system 52–56 may be placed in the cavity 17 for use while cleaning the person 10.

If the mattress is equipped with the bidet system, the operator can turn on the bidet system so that the fluidic cleaning agent can clean that part of the person's body exposed within the cavity 17. The operator (such as the person lying on the bed or an attendant) activates the bidet system by turning a valve 42 that releases the fluidic cleaning agent from a storage container 43 into the pliable tubing 40 within the mattress 14. When the fluidic cleaning agent reaches the end of the pliable tubing 40 at the mattress cavity 17, it is expelled into the cavity 17 in the direction of the person's lower body exposed therein. When the person has finished using the bidet system, the operator may complete cleaning and drying the person by taking advantage of tissue paper and hand wipes placed on the peg 72 and container 73, respectively, of the attachment 71.

After the person 10 has been cleaned, the operator removes the bedpan 12 or wastebag system 52–56 from the cavity 17 and uses the remote control or control switch 15 to fully expand the cushion 16. If the control switch 15 is located on the mattress, the operator then closes the flap 18 of the mattress protector 20 and the flap 34 of the bedsheet 30. Lastly, the operator closes the fly 31 of the bedsheet 30.

If the bedsheet embodiment of FIGS. 15 and 16 is used, then the operator gathers a bedsheet 30 into the cavity 17 and if desired, places an underpad 33 across the mattress so that it extends into the cavity 17. After this is done, the bedpan or wastebag system can be used as described above.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A mattress system, comprising:
   a mattress having a top surface and a bottom surface;
   a cavity arranged in the mattress, the cavity being open at least toward the top surface and having a defined size;
   an expandable cushion arranged in the cavity;
   a mattress protector covering at least the top surface of the mattress, the protector including a first portion that extends into the cavity and a second portion that extends over the expandable cushion arranged in the cavity.

2. The system according to claim 1, further comprising:
   a control system operatively coupled with the cushion to control an expansion and contraction of the cushion.

3. The system according to claim 2, wherein the expandable cushion is an inflatable cushion, the control system operating to inflate and deflate the cushion to raise and lower the cushion within the cavity.

4. The system according to claim 3, wherein the inflatable cushion includes an elastic material at least on sides of the cushion, the elastic material being configured to stretch when the cushion is inflated and contract the cushion to a defined size when deflated.

5. The system according to claim 2, wherein the control system is operatively coupled to a spring device within the cushion.

6. The system according to claim 1, wherein the mattress protector has a retainer arranged about a periphery of the cavity in the mattress between the top and bottom surfaces, the retainer being configured to secure a periphery of the first portion of the mattress protector that extends into the cavity.

7. The system according to claim 6, wherein the retainer is a ring and is embedded into the mattress.

8. The system according to claim 6, wherein the retainer fits within an indenture on the periphery of the cavity.

9. The system according to claim 1, wherein the mattress protector has a third portion that extends under the expandable cushion arranged in the cavity.

10. The system according to claim 9, wherein the mattress protector has a retainer arranged about a periphery of the cavity in the mattress between the top and the bottom surfaces, the retainer being configured to secure the first, second and third portions of the mattress protector about the periphery of the cavity.

11. The system according to claim 1, further comprising:
a bedsheet adapted to fit over at least the top surface of the mattress.

12. The system according to claim 11, wherein the bedsheet has an opening located to correspond with the cavity in the mattress to allow access thereto.

13. The system according to claim 12, wherein the opening is one of a fly opening and a slit with a flap opening.

14. The system according to claim 11, further comprising:
an underpad adapted to be placed on top of the bedsheet and including a portion that extends into the cavity and over the expandable cushion arranged in the cavity.

15. The system according to claim 1, further comprising:
a human waste container arrangeable over the expandable cushion within the cavity in an unexpanded state of the cushion, the human waste container being raised and lowered within the cavity by the expansion and contraction of the cushion.

16. The system according to claim 15, wherein the human waste container is a bedpan.

17. The system according to claim 1, further comprising:
a human waste container arrangeable over the expandable cushion within the cavity in an unexpanded state of the cushion, wherein the human waste container includes:
a support ring adapted to mate with at least a portion of the cavity opening and being supported on the top surface of the mattress; and
a wastebag, the wastebag being secured by the support ring and extending into the cavity.

18. The system according to claim 17, wherein the support ring is under tension when mated with the cavity opening.

19. A mattress system, comprising:
a mattress having a top surface and a bottom surface;
a cavity arranged in the mattress, the cavity being open at least toward the top surface and having a defined size;
an expandable cushion arranged in the cavity; and
a human waste container arrangeable over the expandable cushion within the cavity in an unexpanded state of the cushion, the human waste container being raised and lowered within the cavity by the expansion and contraction of the cushion.

20. The system according to claim 19, wherein the human waste container is a bedpan.

21. The system according to claim 19, further comprising a control system, which includes:
a fluidic pump arranged to pump fluid into the expandable cushion;
a fluid relief mechanism arranged to allow fluid to escape the expandable cushion; and
a control switch operatively coupled with the fluidic pump and relief mechanism to control expansion and contraction of the expandable cushion.

22. The system according to claim 21, wherein the fluid is air, the control switch controlling an inflation and deflation of the expandable cushion.

23. The system according to claim 21, wherein the fluid relief mechanism is a vacuum pump.

24. The system according to claim 23, wherein the expandable cushion is filled with a foam material.

25. The system according to claim 21, wherein the control switch is a remote control switch.

26. The system according to claim 19, wherein in an expanded state, a top surface of the cushion is substantially flush with the top surface of the mattress.

27. The system according to claim 19, wherein the expandable cushion comprises a series of expandable chambers.

28. The system according to claim 19, wherein the mattress has a defined indenture load deflection plane, the cavity, cushion and mattress being configured such that a top portion of the human waste container, when arranged over the cushion within the cavity, substantially corresponds with the defined indenture load deflection plane of the mattress.

29. The system according to claim 19, further comprising:
a bidet system arranged to release a fluidic cleaning agent into the cavity.

30. The system according to claim 19, wherein the cavity is also open toward a lateral side of the mattress.

31. The system according to claim 30, wherein the human waste container is insertable into the cavity through the lateral side opening in the mattress when the expandable cushion is in its contracted state.

32. A mattress system, comprising:
a mattress having a top surface and a bottom surface;
a cavity arranged in the mattress, the cavity being open at least toward the top surface and having a defined size;
an expandable cushion arranged in the cavity;
a human waste container arrangeable over the expandable cushion within the cavity in an unexpanded state of the cushion, wherein the human waste container includes:
a support ring adapted to mate with at least a portion of the cavity opening and being supported on the top surface of the mattress; and
a wastebag, the wastebag being secured by the support ring and extending into the cavity.

33. The system according to claim 32, wherein the wastebag includes an elastic edge to secure the wastebag to the support ring.

34. A mattress system, comprising:
a mattress having a top surface and a bottom surface;
a cavity arranged in the mattress, the cavity being open at least toward the top surface and having a defined size;
an expandable cushion arranged in the cavity; and
wherein in an expanded state, a top surface of the cushion is located below the top surface of the mattress, and further comprising a mattress-like product, the mattress-like product covering substantially the entire top surface of the cushion between the top surface of the cushion in the expandable state and a surface substantially flush with the top surface of the mattress.

35. A mattress system, comprising:
a mattress having a top surface and a bottom surface;
a cavity arranged in the mattress, the cavity being open at least toward the top surface and having a defined size;
an expandable cushion arranged in the cavity;
a control system operatively coupled with the cushion to control an expansion and contraction of the cushion;
a fluidic pump arranged to pump fluid into the expandable cushion;
a fluid relief mechanism arranged to allow fluid to escape the expandable cushion;
a control switch operatively coupled with the fluidic pump and relief mechanism to control expansion and contraction of the expandable cushion;
wherein the fluid is air, the control switch controlling an inflation and deflation of the expandable cushion; and
wherein the expandable cushion is equipped with ventilation openings and wherein said air is constantly or intermittently pumped into the cushion when in its expanded state.

36. A mattress system, comprising:

a mattress having a top surface and a bottom surface;

a cavity arranged in the mattress, the cavity being open at least toward the top surface and having a defined size;

an expandable cushion arranged in the cavity;

a bidet system arranged to release a fluidic cleaning agent into the cavity; and wherein the bidet system comprises:

a storage container for the fluidic cleaning agent; and pliable tubing embedded in the mattress, one end being coupled to the storage container and the other end being coupled into the cavity;

wherein the fluidic cleaning agent in the storage container is released into the pliable tubing and expelled in the cavity.

37. The system according to claim 36, wherein flow of the fluidic cleaning agent released from the storage container is controlled by a valve.

38. The system according to claim 37, wherein the valve is arranged on the mattress.

39. The system according to claim 36, wherein the pliable tubing is arranged in the mattress in a region upon which a person rests.

40. A method of facilitating human excretions by a substantially bedridden person, the method comprising the acts of:

contracting an expandable cushion arranged in a cavity formed in a mattress on which the person lies;

inserting a human waste container into the cavity on top of the cushion, the contracted expandable cushion being located in a portion of the cavity below a top surface of the mattress; and after receiving the person's excretions, removing the human waste container and expanding the cushion to fill the cavity.

41. The method according to claim 40, wherein the cushion is an inflatable and deflatable cushion.

42. The method according to claim 40, wherein the human waste container is a bedpan.

43. The method according to claim 40, wherein the human waste container is a disposable wastebag.

44. The method according to claim 40, further comprising the act of varying an expansion or contraction state of the cushion to position the human waste container in relation to the bedridden person.

45. The method according to claim 40, further comprising the act of operating a bidet system to clean the person's lower body exposed within the cavity prior to expanding the cushion to fill the cavity.

\* \* \* \* \*